United States Patent
Hosier

(10) Patent No.: US 8,150,283 B2
(45) Date of Patent: Apr. 3, 2012

(54) METHOD AND SYSTEM FOR MINIMIZING NON-UNIFORMITIES IN OUTPUT IMAGES USING HALFTONE CORRECTION PATCHES

(75) Inventor: Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 185 days.

(21) Appl. No.: 12/706,327

(22) Filed: Feb. 16, 2010

(65) Prior Publication Data

US 2011/0200346 A1 Aug. 18, 2011

(51) Int. Cl.
*G03G 15/00* (2006.01)
*G03G 15/08* (2006.01)
(52) U.S. Cl. ............ 399/49; 358/3.06; 358/504; 399/72
(58) Field of Classification Search .................... 399/49, 399/72; 347/19; 358/3.06, 406, 504, 534, 358/536
See application file for complete search history.

(56) References Cited

U.S. PATENT DOCUMENTS

| | | | |
|---|---|---|---|
| 7,830,554 B2 * | 11/2010 | Metcalfe et al. | 358/3.06 X |
| 2009/0047032 A1 | 2/2009 | Hosier et al. | |
| 2010/0014877 A1 * | 1/2010 | Sheflin et al. | 399/49 |
| 2010/0278548 A1 * | 11/2010 | Burry et al. | 399/49 |

* cited by examiner

*Primary Examiner* — Sophia S Chen
(74) *Attorney, Agent, or Firm* — Pillsbury Winthrop Shaw Pittman LLP

(57) ABSTRACT

Disclosed herein are a method and a printing apparatus implementing the method to minimize cross-process direction non-uniformities of color images in printed documents. When printing images on a photoreceptor, halftone test patches are generated for each color. A first halftone cell orientation (of dots) of the test patches and their corresponding color image data is determined. The halftone cells of test patches may be provided or rotated to a second orientation (or angle or degrees) for printing in an inter-document zone of the photoreceptor, while the first orientation of the color image data in the document image area of the photoreceptor remains the same. Errors or non-uniformities (e.g., with TRC correction) caused by sensor misreading of test patches at specific orientations in the cross-process direction are substantially eliminated, thereby providing output images without streaks or visible errors.

26 Claims, 10 Drawing Sheets

SENSED IMAGE WITH NO BUTTING ERROR

SENSED IMAGE WITH BUTTING ERROR

METHOD AND SYSTEM FOR MINIMIZING NON-UNIFORMITIES IN OUTPUT IMAGES USING HALFTONE CORRECTION PATCHES

BACKGROUND

1. Field

The present disclosure is generally related to minimizing cross-process direction non-uniformities of output images in printed documents caused by sensor misreadings using halftone patches.

2. Description of Related Art

An array sensor may be used in a printing device to scan images for output and thereby measure a wide variety of image defects that might occur in the xerographic or raster process. For example, as known in the art, the array sensor may scan a photoreceptor (e.g., in the form of a belt) to determine if toner is properly dispersed for output. The array sensor may be used to detect both non-uniformities in the cross-process direction and process direction (i.e., streaks and bands, respectively) for marking technologies. "Streaks" as used herein are defined as uniformity variations in the cross-process direction, at all spatial frequencies (i.e., "narrow" streaks as well as "wide" streaks including variations along the lateral side of the image printing system), and at all area coverage levels.

To correct for development induced streaks in a printing device, the array sensor monitors an amount of toner on the photoreceptor for each of the various halftones, or levels of coverage, for each color. For example, as is known in the art, one or more correction or test patches of halftone color may be provided on the photoreceptor. There is typically a routine within the operating system of the printer to periodically create test patches of a desired density at predetermined locations on the photoreceptor. Test patches are used to measure the deposition of toner on paper to measure and control the tone reproduction curve (TRC). Generally, it is known in the art that such measurements are used to correct the toner reproduction curve (TRC) for all pixels in the imaging raster.

Often, however, array sensors may incorrectly sense characteristics of the test patches which can result in the production of streaks and non-uniformities in the output image. For example, even though test patches contain many lines of raster output that are averaged, streaks and other non-uniformities may still be output. FIG. 2 shows a detailed view of a part of a sensed image 14 comprising a plurality of rows of halftone dots 16, 18, and 20 with non-uniformities due to butting error of the sensor chips. The non-uniformity in this case is caused by a sensor perceived overlap shown at 22 of halftone tons in rows 18 and 20. The perceived overlap 22 of rows of halftone dots 18 and 20 will appear as a darker line or streak to the sensor because such a concentration of dots appears to have a greater concentration of color. This perceived overlap will result in producing a lighter streak on a printed document, because TRC correction will attempt to lighten the coverage of halftone dots to compensate for the perceived reading. Alternatively, the sensor may perceive a lighter area or row of halftone dots, and thus induce a dark streak on a printed document after TRC correction.

For example, FIG. 3 illustrates an enlarged, detailed example of a halftone pattern 24 which may be used as a test patch. The halftone pattern 24 of FIG. 3 comprises a plurality of halftone dots 26 in rows or lines whose centers lie oriented (e.g., along an axis C) at an angle that is perpendicular to one or more sensors arranged in an array 30 along axis A (for reading in cross process direction B, as the photoreceptor moves in processing direction P). For example, for halftone patch 24 that is positioned at 90 degrees, the sensor may scan the lines/dots and sense the reflectance of test patch 24, and the sensor output may show a regular halftone pattern. This can be filtered, or averaged out in the cross-process direction, but only at the loss of some cross process spatial adjustment resolution for TRC correction. In addition, if a multi-chip array sensor is used, as shown in FIG. 3, there may be some spatial position error. For example, when the array sensor 30 comprises at least a first sensor (or chip) 32 and a second sensor (or chip) 34 linearly aligned along axis A to read in a cross process direction B, a slight gap 36 may be formed between the two sensors 32 and 34. Such a gap 36 may result in a disruption of the measured halftone frequency determined by each of the color patches. Non-uniformities such as overlap 22 in FIG. 2 may be caused by the gap 36 between at least first and second sensors 32 and 34, because halftone dots, such as those indicated in row 38, may not be sensed or may alternatively be perceived as being closer together. The application of TRC correction may then calculate a lighter area or a darker area for the printed document.

FIGS. 4-6 show in further detail how the sensor's readings may be affected. FIG. 4 shows an exemplary embodiment of an unfiltered profile graph of average output halftone frequencies for a typical normalized sensor response 42 for reflectance for a group of pixel positions or locations (numbers) 44. Each of the lines generally represents a different toner concentration or frequency that is read or sensed. Each of the spikes 46 may represent potential errors or streaks which may be formed in the output image. As shown in greater detail in the detailed example of an unfiltered profile of FIG. 5, a lower peak 45 of halftone frequency may be detected in certain pixel positions. The lower peak 45 may be a detailed view of one of the spikes 46 of FIG. 4, for example. Lower peak 45 may represent a potential butting error or non-uniformity read by a sensor array, such as the perceived overlap shown in FIG. 2. This indicates that there is less white on the photoreceptor (i.e., more toner) and that the sensor is missing the detection of the part without toner thereon (i.e., because of the gap 36). Even if such data is filtered, the butting error or non-uniformity can still be present in the frequency curve as shown by the dip or valley 47 in the filtered halftone frequency profile of FIG. 6. This indicates that the sensor/chip placement of the array sensor 30 has affected the reading of the amount of toner (or level of coverage) of the patch(es) in adjacent scan areas (e.g., due to the pattern, scan, or positioning error). Then, even more cross-processing filtering may be needed, with the results having less TRC correction resolution. Even with more filtering, errors or non-uniformities are still present in the output image.

SUMMARY

One aspect of the disclosure provides a processor-implemented method for minimizing cross-process direction non-uniformities of images in printed documents using a printing apparatus. The printing apparatus has a processor for processing documents containing image data, an image bearing surface with a monitoring area and an image area for movement in a process direction, and one or more sensors for monitoring the image bearing surface in a cross-process direction. The processor implements the method including:

receiving color image data of a document, the image data having a plurality of color pixels and the document comprising at least one page of image data;

generating a halftone test patch for each color in the image data to be provided in the monitoring area on the image bearing surface;

determining profile data of each test patch, the profile data including a first orientation of halftone dots of the test patch representing a halftone orientation of its associated halftone color image data for output in the image area of the image bearing surface;

determining a second orientation for the halftone dots of the at least one test patch; and providing the halftone dots of the at least one test patch at a second orientation in the monitoring area, wherein the halftone orientation of its associated halftone color image data in the image area is unaffected for output.

Another aspect of the disclosure includes a printing apparatus for processing documents containing image data, an image bearing surface, and one or more sensors. The printing apparatus has: a photoreceptor having an image area and an inter-document zone for movement in a process direction; a plurality of color marking stations for applying color in a process direction to the photoreceptor in the image area and the inter-document zone; one or more array sensors for sensing the color applied to the photoreceptor in a cross-process direction; and a processor for receiving color image data of a document, the image data comprising a plurality of color pixels and the document comprising at least one page of image data. The processor performs the following operations:

generating a halftone test patch for each color in the image data to be provided in the inter-document zone;

determining profile data of each test patch, the profile data including an first orientation of halftone dots of the test patch representing a halftone orientation of its associated color for output in the one or more image areas;

determining a second orientation for the halftone dots of the at least one test patch; and producing the halftone dots of the at least one test patch at a second orientation in the inter-document zone, wherein the halftone orientation of its associated color in the one or more image areas is unaffected for output.

Other features and advantages of the present disclosure will become apparent from the following detailed description, the accompanying drawings, and the appended claims.

DETAILED DESCRIPTION OF THE EMBODIMENT(S)

Figure 1:
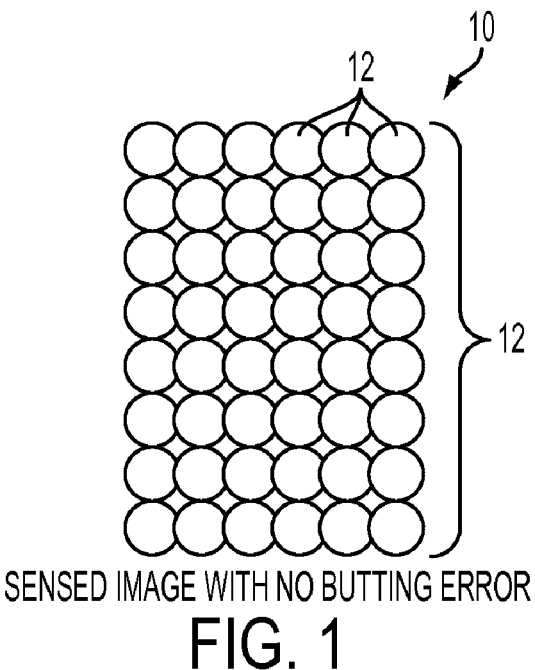
FIG. 1 illustrates a detailed view of a part of a sensed image comprising a plurality of halftone dots printed in a uniform manner.
Figure 2:
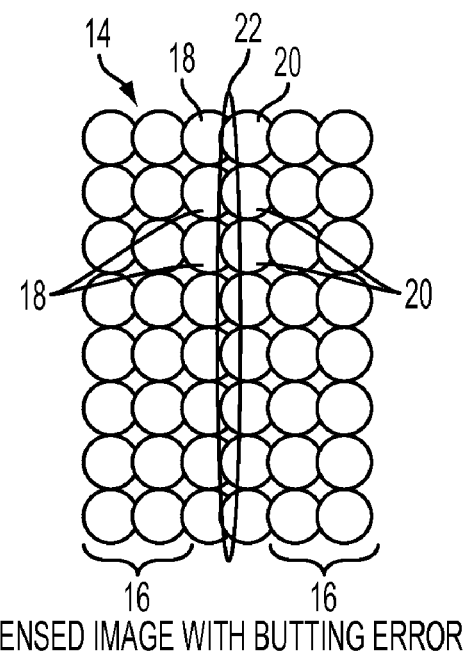
FIG. 2 illustrates a detailed view of a part of a sensed image comprising a plurality of halftone dots with non-uniformities due to butting error of halftone dots.

When printing color images using halftones, an output image that has uniform output is desirable. For example, FIG. 1 illustrates a detailed view of a part of an output image 10 generated by an electronic printing apparatus comprising a plurality of halftone dots 12 printed in a uniform manner and having no butting error or non-uniformities. Such uniform dots 12 will appear as a single color (or an alternate color if overlapped with one or more other colors) to the human eye on a printed document. Each color that is output may be printed at a different angle or orientation with respect to the other colors (and possibly overlay each other) which is not visible to the human eye. For example, cyan (C), magenta (M), and yellow (Y) dots may be oriented at 30, 50, and 70 degrees, respectively, and black (K) dots may be oriented at 0 or 90 degrees in an image for output. The printing and overlay of each color at a different orientation is known to produce better quality output images (e.g., preventing moiré effects). Typically halftone dots of the test patches are printed at the same orientation as halftone dots for output in a monitoring area, a document image area, or other area on a photoreceptor for sensing. However, as noted above, some orientations of halftone dots of the test patches may cause errors and/or non-uniformities in TRC correction when such test patches are read in a cross-process direction (with respect to a processing direction of the photoreceptor) by array sensors in printing apparatuses. An output image may thus include streaks and other errors when printed. FIG. 2 shown an example of an enlarged, detailed copy of an example of a halftone pattern generated by an electronic printing apparatus for an image wherein the halftone dots 16, 18, and 20 have a visible butting error caused by overlap 22. The overlapping of halftone dots in the rows will appear to closer together to a sensor and such an area will appear darker. Thus, an application of TRC correction will lighten the halftone dots for printing, which will appear to be a lighter line or streak to the human eye. Such an overlap 22 may be caused by the gap 36 between the array including first and second sensors 32 and 34. Therefore, this disclosure provides a method and an apparatus for minimizing cross-process direction non-uniformities of images such as these in printed documents. More particularly, this disclosure describes using different orientations for halftone test patches in monitoring areas and their associated halftone colors for printing in document imaging areas. By adjusting the orientation of the halftone dots in the test patches, the sensor reading is improved, and thus so is the output halftone dots in the image area for printing.

To perform such an operation, disclosed further below, any number of printing apparatuses or systems may be used. In an embodiment, an electrophotographic image printing system may be used. Electrophotographic image printing systems may produce color prints using a plurality of stations. Each station has a charging device for charging the image bearing surface, an exposing device for selectively illuminating the charged portions of the image bearings surface to record an electrostatic latent image thereon, and a developer unit for developing the electrostatic latent image with toner particles. Each developer unit deposits different color toner particles on the respective electrostatic latent image. The images are developed, at least partially in superimposed registration with one another, to form a multi-color toner powder image. The resultant multi-color powder image is subsequently transferred to a media (e.g., paper). The transferred multicolor image is then permanently fused to the media forming the color print.

Figure 7:
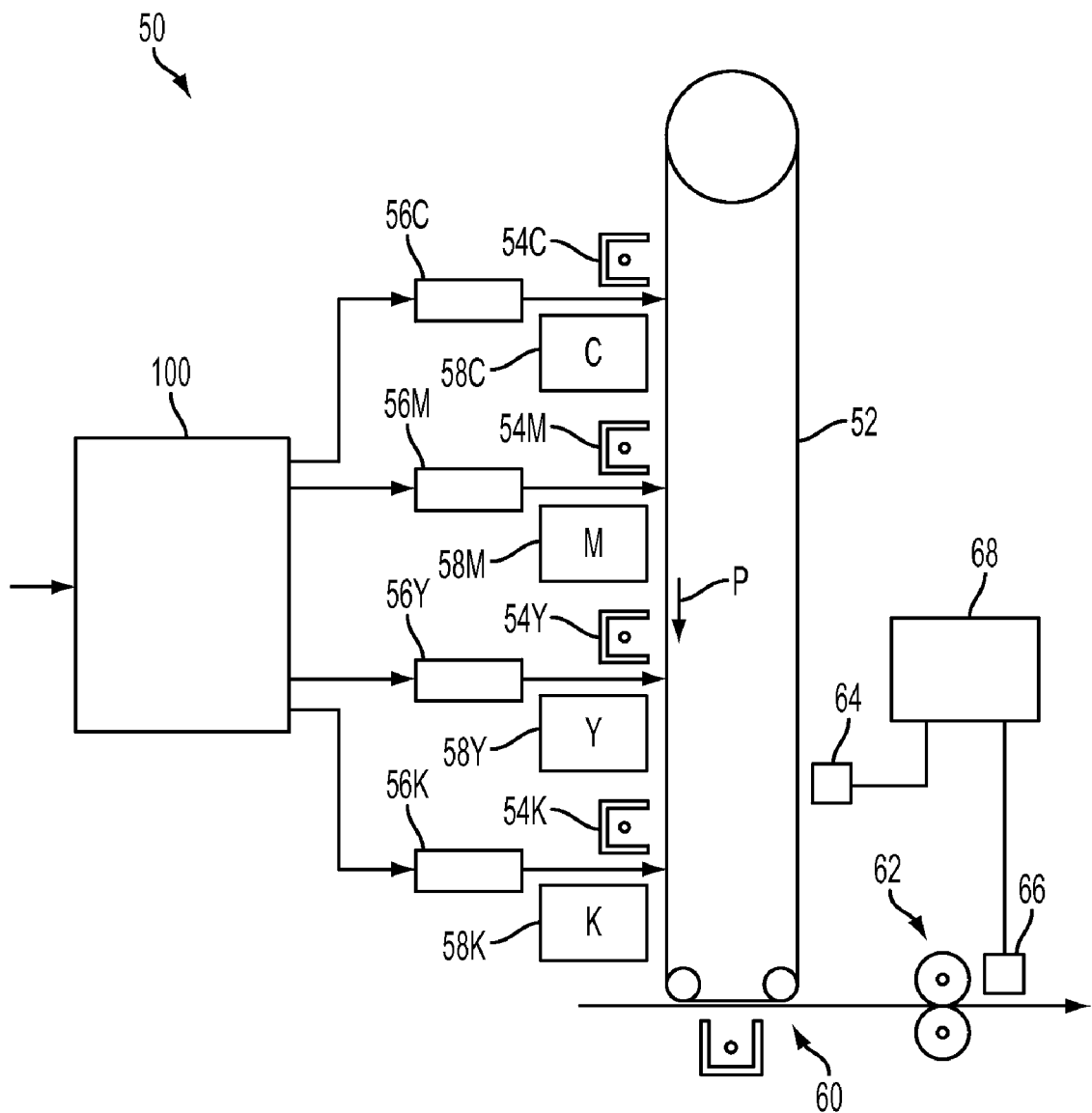
FIG. 7 illustrates an exemplary view of elements in a color printing apparatus.

FIG. 7 is an exemplary elevational view of such elements of a color printing apparatus 50 used in accordance with an embodiment of this disclosure. Specifically, there is shown an "image-on-image" xerographic color printer, in which successive primary-color images are accumulated on an image bearing surface 52 (e.g., a photoreceptor belt), and the accumulated superimposed images are in one step directly transferred to an output sheet as a full-color image. In one implementation, the Xerox Corporation iGen3® or iGen4® digital printing press may be utilized. However, it is appreciated that any printing machine, such as monochrome machines using any technology, machines which print on photosensitive substrates, xerographic machines with multiple photoreceptors, or ink-jet-based machines, can beneficially use embodiments of the present application as well.

The embodiment of FIG. 7 includes an image bearing surface 52 in the form of a belt photoreceptor. Of course, it is to be understood that the type of image bearing surface used in the apparatus is not meant to be limiting. For example, image bearing surface 52 may comprise a drum configuration, transfer belt, rollers, or the like. Adjacent and along the image bearing surface 52 are disposed a series of stations, as is generally familiar in the art of xerography, one set for each primary color to be printed. For instance, to place a cyan color separation image on image bearing surface 52, there is a marking station comprising an electrostatic charge device (e.g., a corotron) 54C, an imaging laser 56C, and a development unit 58C. For successive color separations, there is provided equivalent marking station elements 54M, 56M, 58M (for magenta), 54Y, 56Y, 58Y (for yellow), and 54K, 56K, 58K (for black). The successive color separations are built up in a superimposed manner on the surface of image bearing substrate 52, and then the combined full-color image is transferred at transfer station 60 to an output sheet. The output sheet is then run through a fuser 62, as is familiar in xerography.

Also shown in the FIG. 7 are monitors in the form of sensors 64 and 66, which can feed back to a control device 68. The sensors such as 64 and 66 are devices which can make measurements with respect to images created on the image bearing surface 52 (such as sensor 64) or to images which were transferred to an output sheet (such as sensor 66). These sensors can be in the form of optical densitometers, colorimeters, electrostatic voltmeters, etc. Sensors 64 and/or 66 may include a detector configured to detect light (e.g., ultraviolet light (UV), visible, and infrared radiation (IR)), and light reflected from a substrate (e.g., photoreceptor or image bearing surface). There may be provided any number of sensors, and they may be placed anywhere in the printer as needed, not only in the locations illustrated. The information gathered therefrom is used by control device 68 in various ways to aid in the operation of the printer, whether in a real-time feedback loop, an offline calibration process, a registration system, etc.

Figure 8:
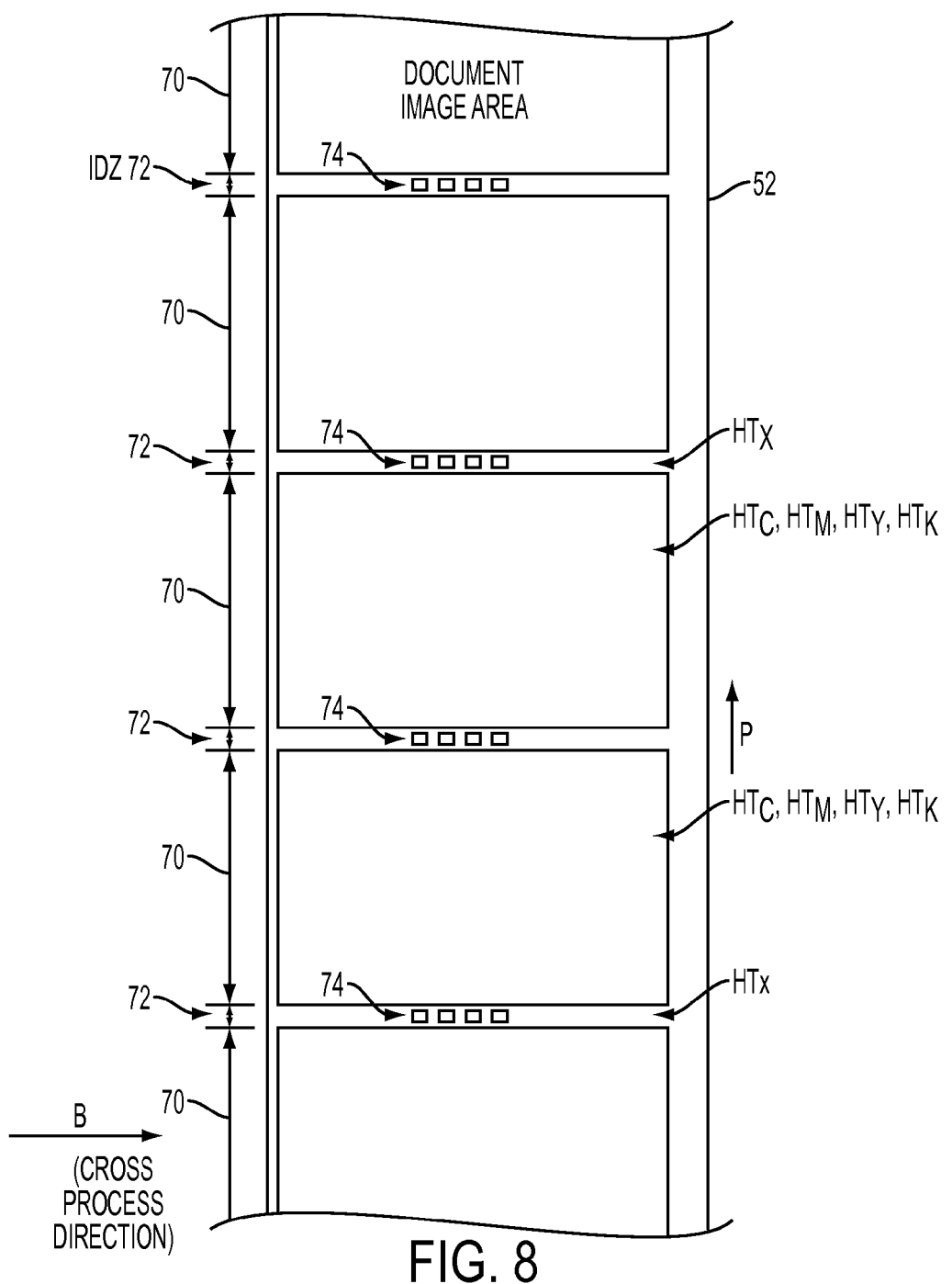
FIG. 8 illustrates a top plan view of an image bearing surface including image areas and patches in inter-document zones in accordance with an embodiment of the disclosure.
Figure 10:
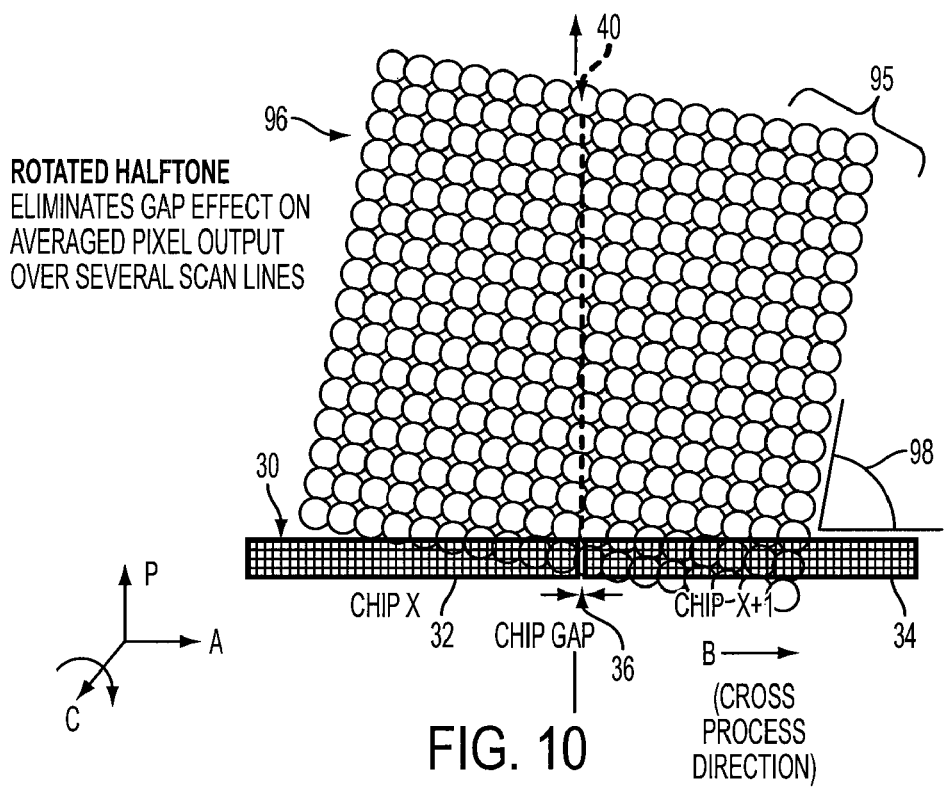
FIG. 10 illustrates an example of a halftone test patch at a second orientation and a plurality of sensors in accordance with an embodiment of the present disclosure.

As noted above, such sensors 64 and 66 may be provided in a linear array 30 to read information in a cross-process direction as indicated by arrow B in FIG. 8. The sensors may be positioned adjacent the image bearing surface 52 to capture reflected light and the like as the surface 52 is moved in a processing direction P. The array may comprise a multi-chip configuration, as shown in FIG. 10, that includes at least a first sensor 32 and a second sensor 34 arranged linearly to read the image bearing surface 52 in a cross-process direction B (i.e., a direction that is perpendicular to the processing direction P) as the image bearing surface 52 moves in processing direction P. In an embodiment, array 30 may comprise a full width array (FWA) multi-chip butted CMOS sensor. In another embodiment, linear array 30 may comprise a CCD contact image sensor (CIS). However, the type of array 30 or sensors 64 and 66 used in the apparatus 50 should not be limiting. Generally, it is to be understood for explanatory purposes only that array sensor 30 comprises a multi-chip configuration, which is defined as a set of two or more chips (e.g., with photosensors thereon) that are abutted together to form a single, page-width array. Such chips are typically arranged end-to-end in a linear array as shown by sensors 32 and 34 in the FIGS., for example. Adjacent chips may not complete the linear sequence and therefore a gap 36 is left between the chips. Also, it is to be understood the gap 36 is generally small, and its size may comprise a few micrometers (um). For example, when the chips or sensors are aligned, the gap 36 may be configured to comprise a maximum of about 10 um.

FIG. 8 is a plan view of a portion of image bearing surface 52 in the form of a photoreceptor. Within a color printing apparatus such as printer 50 shown in FIG. 7, the photoreceptor 52 will move in a process direction P. At any arbitrarily chosen location on the photoreceptor 52, there can be considered what is called an "imageable area" indicated as image areas 70 and an inter-page or inter-document zones (IDZ) 72. An "imageable area" is defined as an area used for printing at least a part of an image for output and/or printing onto a document or page. An inter-document zone or IDZ 72 is defined as one or more areas between imageable areas on the image bearing surface that is not used for printing on a document, but may be used for monitoring or sensing halftone color image data to be output on a document. The image area 70 may, but need not, correspond in some way to an area on which an image desired to be printed is placed (including a predetermined inter-page or inter-document zone (IDZ) 72). For example, halftone dots of color for output on a page, as indicated by HTc, HTm, HTy, and HTk in FIG. 8, may be applied to the image area 70. Also, it may, but need not, correspond to one or another physical "landmark" formed in or on photoreceptor 52, such as a seam or hole; indeed, the entire surface of the photoreceptor 52 may be considered the imageable area. Also, as generally known in the art, the image area 70 may be defined relative to an origin point in a coordinate system, from which any other point within the imageable area can be located. An enabled coordinate system can facilitate locating a desired test mark essentially anywhere in the image area. Alternatively, halftone test patches may be placed on one or more areas of IDZ 72, and these test marks will not be printed on a document or page, but rather used for monitoring and sensing by one or more sensors (e.g., array sensor 30).

Typically, a printer using control systems which rely on sensors such as 64, 66 creates test patches 74, which are made/printed and subsequently measured in various ways by one or another sensor. "Test patches" are defined as marks of color (e.g., toner) which are provided on image bearing surface 52 (e.g., in the form of halftone dots) and used to monitor features for printing documents. Test patches may be used to monitor an amount of toner on the photoreceptor/image bearing surface for each of the various halftones, or levels of coverage, for each color. For example, test patches may be used to measure the deposition of toner on paper to measure and control the tone reproduction curve (TRC). Test patches may be in the form of marks (e.g., dots) of a predetermined darkness value, a predetermined color blend, a desired density, or a particular shape, such as a line pattern; or they may be of a shape for determining registration of superimposed images (e.g., fiducial or registration marks). Test patches of specific types may be placed on image bearing surface 52 at specific or predetermined locations on the image bearing surface 52. For example, as shown in FIG. 8, a plurality of test patches 74 or HTx may be placed in the IDZ 72 (while image data is placed in the document image area(s)). Such test patches 74 may be made on image bearing surface 52 by one or more lasers such as 56C, 56M, 56Y, and 56K. The printing process of the test patches 74 may be controlled, for example, by a print controller 100 and/or processor.

Throughout this disclosure, it should be understood to one of ordinary skill in the art that reference to halftone dots, halftone color, and halftone test patches (and other such terms) can also refer to halftone cells. As known in the art, a printer provides halftone dots by means of a halftone cell that includes pixels (e.g., black or white). Depending on the number of dots provided in a cell, the amount of gray or toner coverage may be altered to change the shade of gray represented in a printed halftone image. The toner area coverage, AC, is defined as the percentage of toner area covering a unit halftone cell in a sample target that is available to reflect. As known in the art, toner density patches may be varied uniformly for each test patch (or cell) from about 0 to about 100%.

Areas for the test patches 74 are moved past the development units 58C, 58M, 58Y, and 58K and the toner particles within the development units 58C, 58M, 58Y, and 58K are caused to adhere to the areas for the test patches 74 electrostatically. The test patches 74 are placed on the image bearing surface 52 in locations where they can be subsequently measured by one or more sensors elsewhere in the printer, for whatever purpose. Generally, the denser the toner on the test patch, the darker the test patch will appear in optical testing. To determine the amount of toner, for example, the developed test patch is moved past a light sensing device disposed along the path of the image bearing surface 52, and light absorption of the test patch is tested; the more light that is absorbed by the test patch, the denser the toner on the test patch. The sensor readings are then used in coordination with the controller 100 and/or processor to make suitable adjustments to the apparatus 50 (e.g., TRC correction). Such determinations are generally known in the art and therefore are not discussed in further detail herein.

As previously noted, in systems or apparatuses that print different colors (e.g., CMYK) using halftone dots, it is known to provide each color at a different angle or orientation in the output for printing. In this disclosure, a halftone test patch representing each associated color is provided with halftone dots at a different orientation in the patch area (e.g., IDZ 72) of image bearing surface 52. Each halftone test patch provides profile data that is related to the associated halftone color image data for printing the output image. For example, test patches 74 may be formed in inter-page or inter-document zones (IDZs) 72 of the image bearing surface 52 using a procedure, for example, as disclosed in U.S. Pat. No. 6,016,204, incorporated by reference herein, in its entirety. Alternate methods for printing test patches 74 may also be used.

Figure 3:
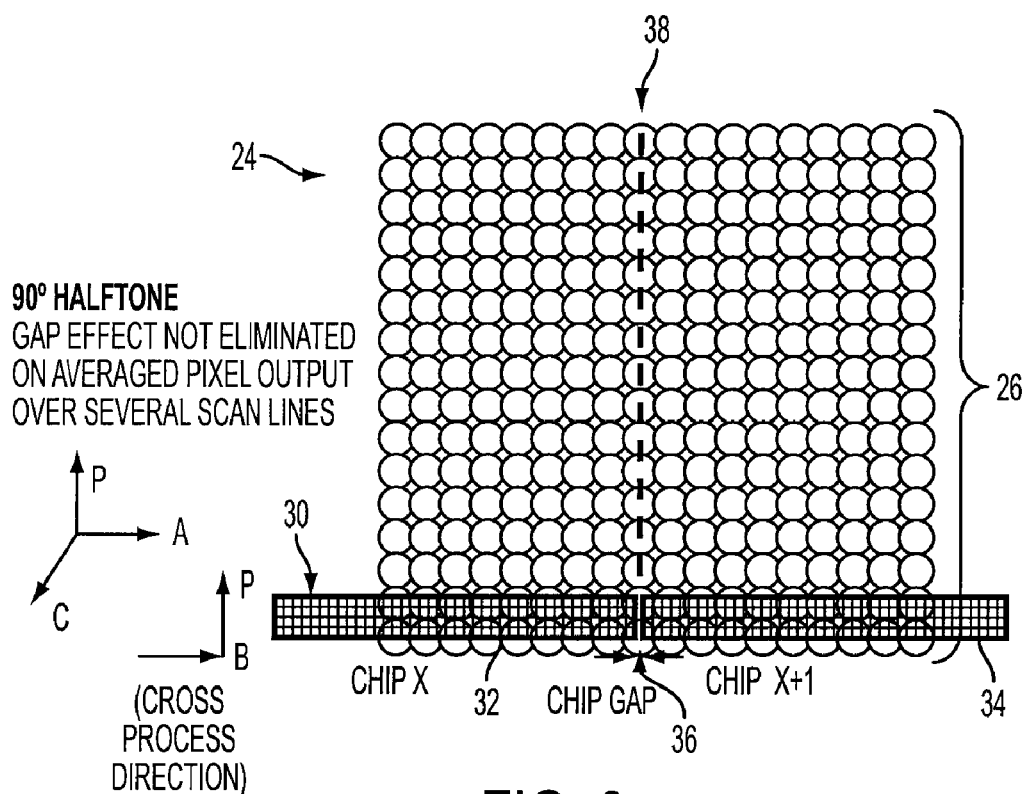
FIG. 3 illustrates a detailed view of an example of a halftone test patch at an first orientation and a plurality of sensors for sensing the test patch.
Figure 4:
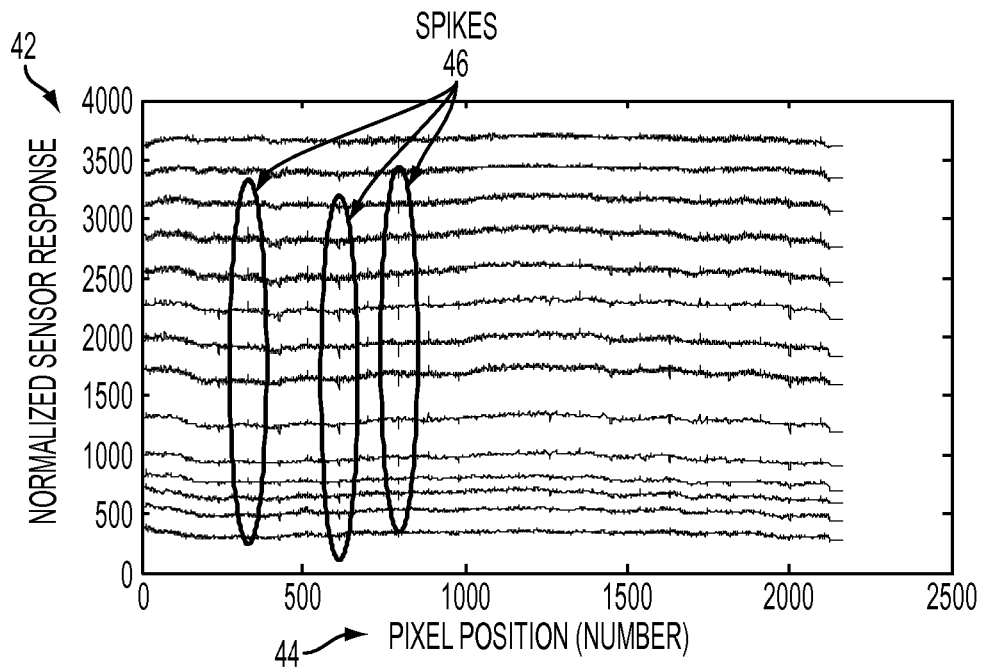
FIG. 4 illustrates a graph showing a typical normalized sensor response for reflectance for a number of colors in an image.
Figure 5:
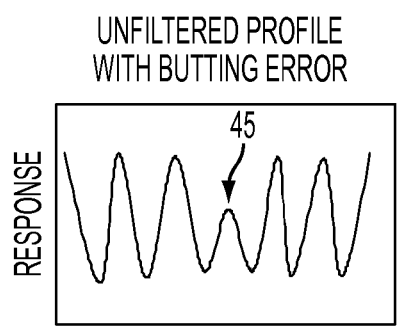
FIGS. 5 and 6 illustrate detailed views of graphs showing an unfiltered and filtered frequency profile, respectively, of FIG. 4.
Figure 6:
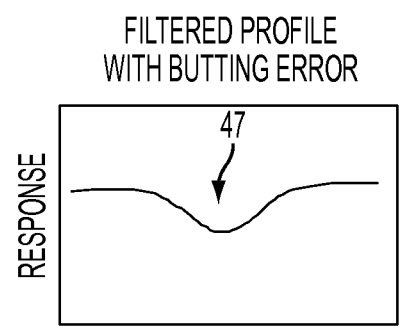
Figure 14:
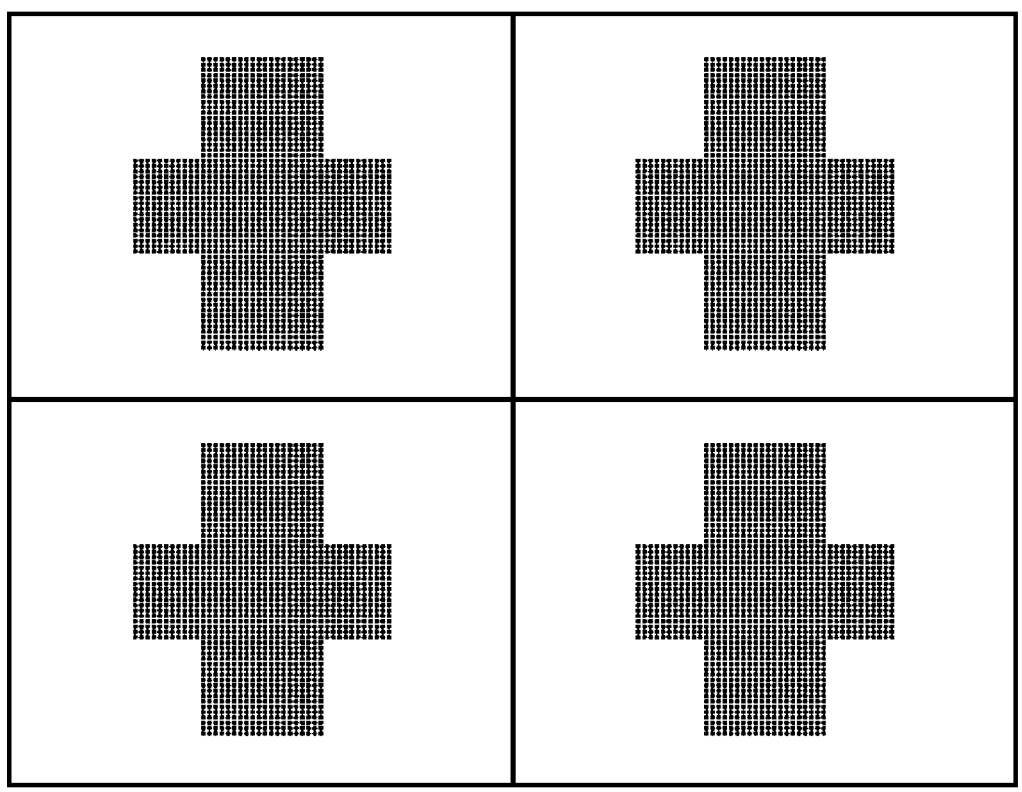
FIG. 14 illustrates a detailed view of an example of a halftone cell at an first orientation.
Figure 15:
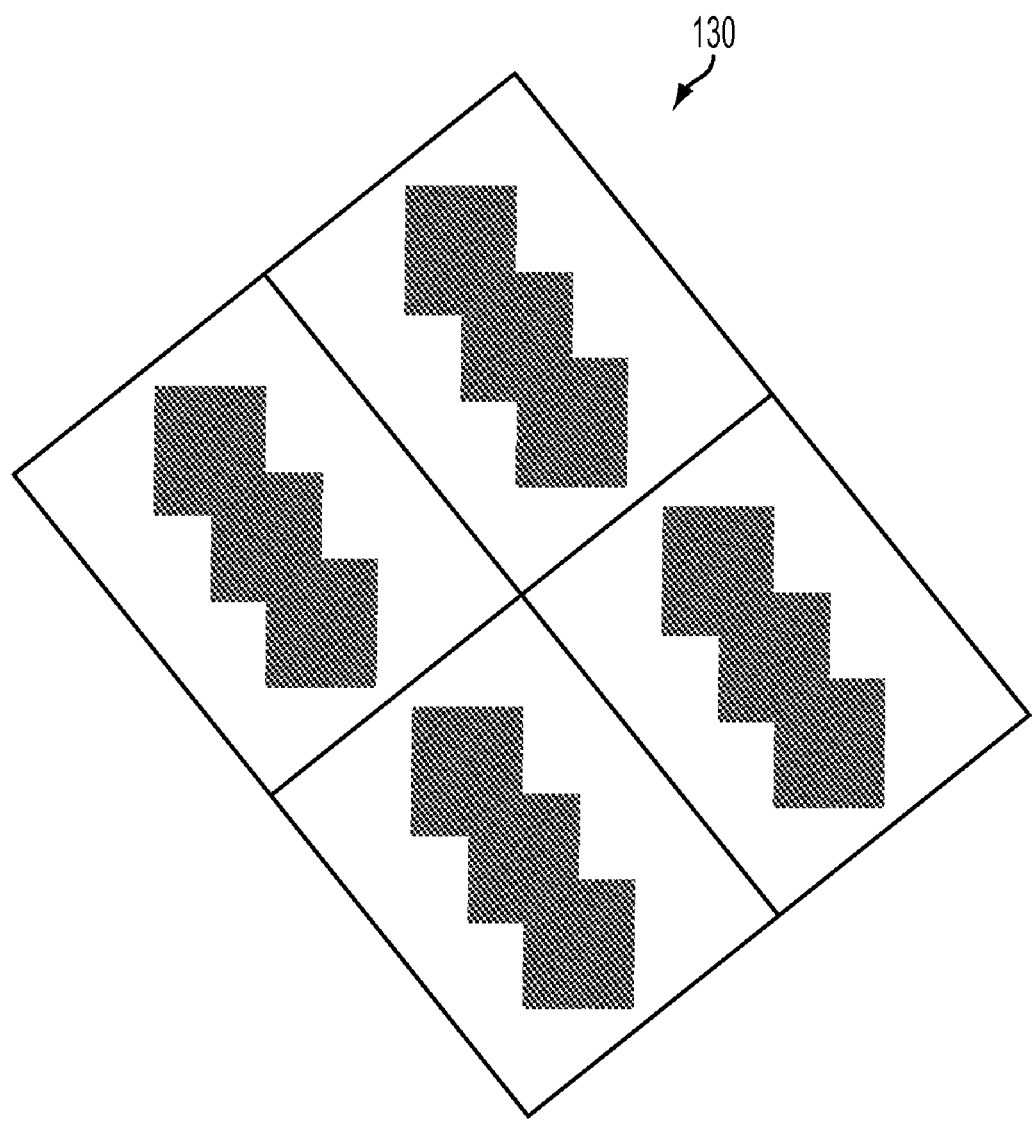
FIG. 15 illustrates an example of a halftone cell at a second orientation.

FIGS. 3 and 10 illustrate exemplary test patches which may be considered for printing on image bearing surface 52. The test patches may be, for example, a 1 inch-square. However, it will be appreciated that any size test patch may be utilized. The toner area coverage AC may be varied uniformly for each test patch from 0 to 100%. For example, FIGS. 14 and 15 illustrate halftone cells 128 and 130, respectively, with approximately one-quarter of the area of the halftone cell covered by toner. Each have a toner area coverage AC of 25% (although their orientation is different). While square and polygonal halftone "dots" are illustrated in the FIGS. and described herein, it will be appreciated that any halftone cell design may be used, for example, including dots or pixels which are circular, rectangular, triangular, etc, in various patterns (shown as shown in FIGS. 14 and 15). Therefore it is to be understood that the term "dots" is not meant to be limiting and generally refers to the halftone image of the test patch.

Such patches may determine and/or coordinate with the output orientation of the halftone dots. For example, if a cyan (C) patch is to be oriented at an angle of 30 degrees for printing onto the image bearing surface 52 (although such an angle would not be visible to the human eye), the halftone dots (or cell) for the cyan test patch may be positioned at an angle of 30 degrees. The halftone test patches may use the same halftone patterns as the document images for various reasons. For example, one reason is simplicity in halftone addressing and memory requirements. Using different halftone patterns and orientations for the test patches (e.g., in IDZ 72) and document areas would require some engineering analysis of correlation in developed mass, to see if any global adjustment is needed.

However, as described above, errors or deviations from a target TRC of the actual reproduction curve may be formed from gap 36, and thus lead to non-uniformities and/or errors in gray scale or color of images in output documents due to the orientation of the test patch. Particularly, when an array sensor 30 is used as a sensor 64 and/or 66 as shown in FIG. 3, and at least a first and a second sensor 32 and 34 are aligned, a gap 36 or spot at a connection point may be formed when reading the dots of the test patch. For example, if gap 36 is big enough, the array sensor 30 may not effectively detect the halftone dots of the test patches at their orientations. For example, as shown in FIG. 3, a number of halftone dots are printed for a test patch 24 that are perpendicular to the array sensor 30 (i.e., to read the test patch in a cross-process direction). A line 38 of halftone dots thus may fall into the chip gap 36 and may not be read by the sensors 32 and 34 of the array 30. Therefore, the sensors 32 and 34 miss one or more halftones in the gap 36 thereby causing the undesirable output (even with limited filtering). As shown by FIGS. 2-6, significant error in chip/sensor placement in array sensors requires filtering an amount of pixels that cuts into the sharpness of the streak correction. Or, if the filtering is not enough, the error will induce a perceived darker streak by the sensor (at the chip gap 36) as shown by overlap 22. Thus, in the TRC corrected output, a lighter streak will be printed on the document. By tilting or moving the halftone dots of the test patch to a different orientation from its original orientation computed for output, the sensor 30 is able to effectively read and output the halftone dots for printing.

Although any orientation of a test patch may be manipulated, for explanatory purposes only in this disclosure reference is made to halftone test patches that are oriented at 90 degrees (e.g., examples shown in FIGS. 3 and 14). Since 90 degree halftones may be needed for one color layer in a color printer, using halftone test patches (e.g., in the inter-document zone (IDZ) 72) with halftone dots that are at a different orientation than the halftones used for the same layer in the document image area 70 will correct errors due to inadequate sensor readings. For example, C, M, and Y colors may be oriented at 30, 50, and 70 degrees, respectively, and K may be oriented at 90 degrees for printing. However, in the monitoring of IDZ area 72, a test patch positioned at 90 degrees is undesirable. Thus, using the herein disclosed method, the K monitor patch would be positioned at an alternate orientation other than at an angle of 90 degrees (or zero degrees) in the IDZ area 72.

Figure 9:
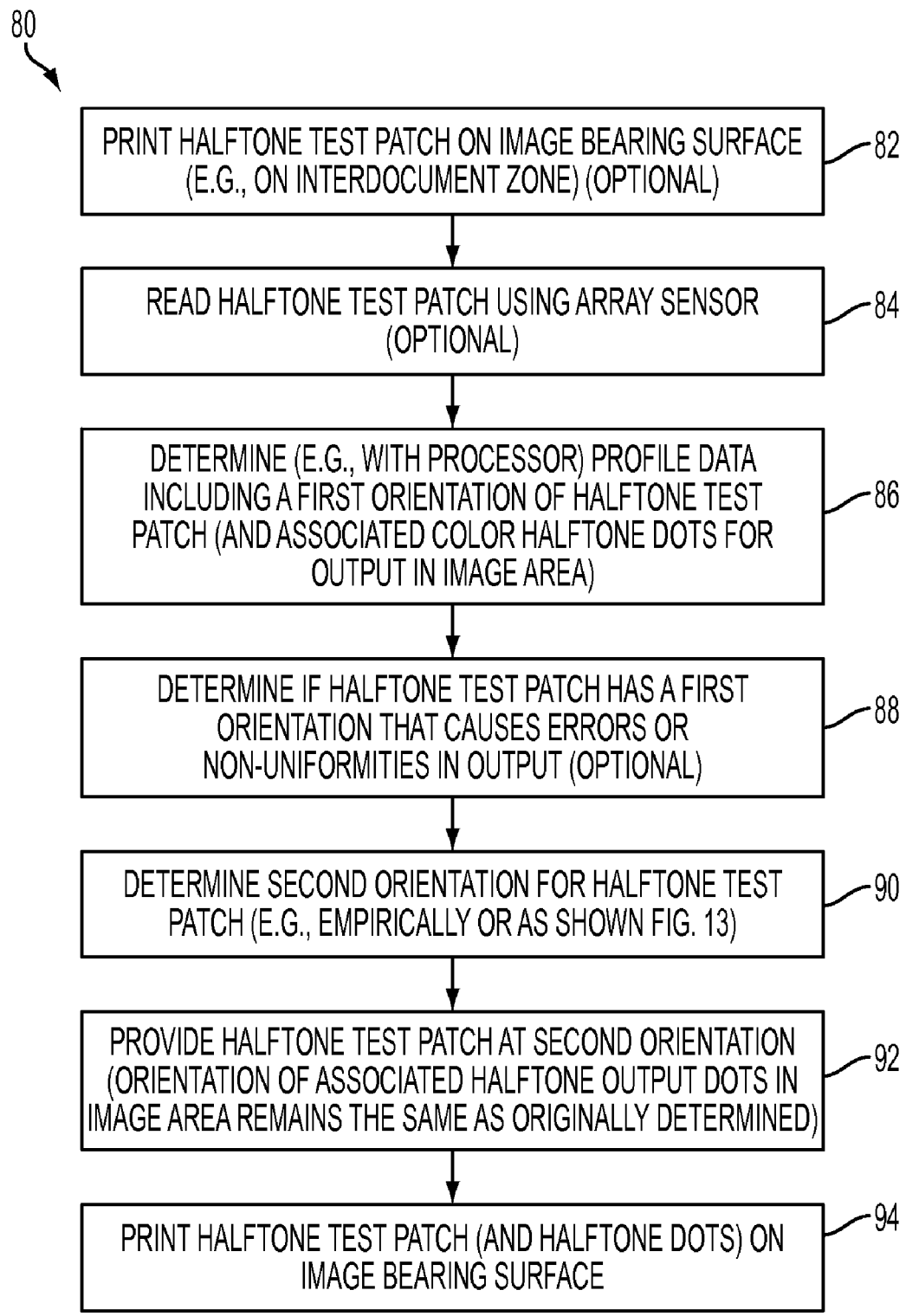
FIG. 9 illustrates an exemplary method for minimizing cross-process direction non-uniformities of images in printed documents in accordance with an embodiment of the disclosure.

In order to correct such misreadings and thus the output of halftone dots, the present disclosure provides a method for adjusting halftone test patterns and TRC correction for array sensors 30. More specifically, FIG. 9 illustrates a method 80 for minimizing cross-process direction non-uniformities of images in printed documents due to array sensors 30. As shown, in an embodiment, the method 80 may begin by the printing apparatus (such as apparatus 50) printing halftone test patches on image bearing surface (e.g., printing test patches 74 in IDZ 72 of photoreceptor 52) at 82. The halftone test patches may then be read or sensed using sensors (such as sensors 64 and 66 which comprise array sensors such as array 30) at 84. However, such steps may be optional. For example, processor and/or controller 100 of the printing apparatus 50 may not require printing and reading of the test patches as shown at 82 and 84 until an orientation of one or more test patches is determined.

At 86 profile data of the test patches may be determined with a processor and/or controller 100. As noted above, the profile data may be determined after printing and reading at 82 and 84, or before printing. Such profile data includes the determination of a first orientation of the halftone test patches (and the associated color halftone dots for output). In an embodiment, the first orientation may comprise an initial orientation for printing the halftone dots of the test patch and/or the color image data. After the first orientation of the halftone dots of the test patches and halftone dots for output are determined, it may then be optionally determined if any one or more of the halftone test patches has an first orientation that may cause errors or non-uniformities in output at 88. For example, as noted above, in an embodiment it is determined if one or more of the test patches and halftone dots have a first orientation of 90 degrees. If it is determined that the first orientation may cause errors, such as first orientation of 90 degrees, a second orientation for the halftone dots of the related halftone test patch is determined at 90. Alternatively, other methods for determining possible non-uniformities may also be used. In another embodiment, such determination may not need to be made at 88.

A second orientation for halftone test patch is determined at 90. The second orientation for the halftone test patch may be determined empirically or using any number of methods, such as those further described with respect to FIG. 13. The output of the halftone dots for the image area (e.g., area 70), however, will remain at the same orientation. Thereafter, the halftone dots of the test patch are provided at 92 at the second orientation and is processed (e.g., TRC and RIP) and printed at 94 on the image bearing surface 52.

Although the halftone test patch or cell orientation (or angle) changes using the above method, the data that is used for rastering (i.e., black/white or ON/OFF determination of each pixel in each scan line) is created based on the halftone angle, percentage coverage, color, etc. of the read (perceived) test patch, and the raster angle remains the same. The halftone dots of the printed image will also remain at the same orientation (e.g., AC content remains the same, even though the test patch orientation is changed).

The methods for providing the halftone dots of the at least one test patch at the second orientation should not be limiting. For example, in one embodiment, providing the halftone dots of the at least one test patch at the second orientation comprises rotating the halftone dots of the at least one test patch to the second orientation, the second orientation being at an angle from the first orientation. In another embodiment, a new test patch may be generated, the new test patch representing the halftone dots of the (at least one) test patch at the determined second orientation. In another embodiment, a rotated version of the halftone dots of a test patch in the second orientation may be generated. As described, for example, the second orientation of a test patch may comprise the halftone dots of the test patch at an angle that is rotated from the first orientation (e.g., an initial angle or degrees).

For example, test patch 96 in FIG. 10 shows how a halftone orientation that is positioned off of a 90 degree angle from axis A can help with spatial problems, reading halftone frequency, and error due to chip placement (i.e., gap 36 formed by at least first sensor 32 and second sensor 34). The pattern of test patch 96 comprises a plurality of halftone dots 95 in rows whose centers lie oriented (e.g., along an axis C) at an angle 98 with respect to axis A (for reading in cross process direction B, as the image bearing surface 52 moves in processing direction P). For example, for a halftone patch 24 whose dots are positioned at a first orientation of 90 degrees such as provided in FIG. 3, they may be provided, re-oriented, and/or rotated at angle 98 to form test patch 96.

FIG. 15 also illustrates an example of a halftone cell 130 with 25% AC which is oriented at 45 degrees (150 dpi repeat, Raster 2400×2400 dpi)). The cell 130 may represent the halftone cell 128 of FIG. 14 at a second orientation (halftone cell 128 being determined at its first orientation of 90 degrees to have possible errors and/or non-uniformities) (e.g., rotated at an angle) to form a test patch for reading by sensor 30. The raster output does not change and the patches 24, 96 and 128, 130 look visually the same to the human eye (the dpi dots will not be visible when printed—they will look continuous, unless magnified), even though the orientation of the test patch has changed. When a multi-chip array sensor 30 is used to read either halftone test patch 96 or 130, the effects caused by gap 36 are substantially reduced or eliminated. At least first and second sensors (or chips) 32 and 34 are able to sense a number of halftone dots, such as those that intersect row 40 as shown in FIG. 10, and any applied correction techniques (e.g., TRC) will not effectively produce errors or non-uniformities in the output or printed document.

Thus, if halftone test patches have enough scan lines or rows of halftone dots for the array sensor 30 to intercept multiple repeats of multiple phase positions within the halftone frequency (such as shown by the exemplary test patch 96 of FIG. 10 or the halftone cell 130 of FIG. 15), then the average of the readings of test patches in the cross-process direction B to be output will be a better representation of the average halftone density, without any sensor induced or halftone spatial artifacts in the cross-process direction. This will further allow for accurate correction of TRC cross-process defects during development.

Figure 11:
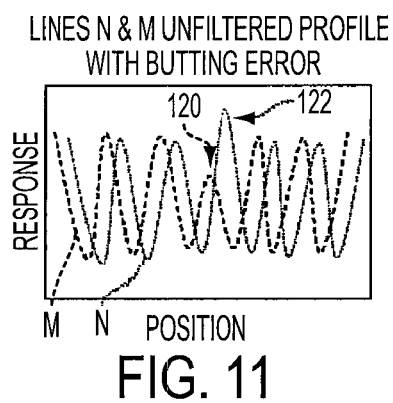
FIGS. 11 and 12 illustrate detailed views of graphs showing an unfiltered and filtered frequency profile, respectively, after processing via the exemplary method of FIG. 9.
Figure 12:
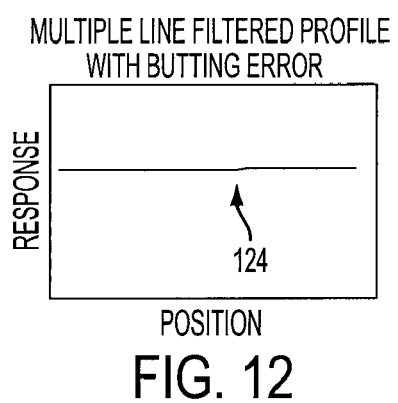

FIGS. 11 and 12 show in further detail how the sensor's readings may be affected (e.g. as compared to FIGS. 5 and 6) when halftone dots of a test patch are oriented to a second orientation. FIG. 11 shows a detailed view of an exemplary embodiment of an unfiltered profile graph of two halftone frequency lines M and N for a normalized sensor response for reflectance (e.g., 12 bit gls) for a group of pixel positions or locations (numbers, e.g., 8000+ pixels may be averaged in groups of 4). The detected frequency lines M and N correspond to the detected halftone dots of the test patch 96 and may have a lower peak 120 or higher peak 122 in FIG. 11 (e.g., indicating a gap or white space) in the frequencies detected in certain pixel positions. Such frequencies M and N are close and may be superimposed, but are not exactly the same. Lower peak 120 or higher peak 122 may represent a potential butting error or non-uniformity of test patch 96 read by sensor array 30, which correspond to gap 36. Although the sensor 30 may be missing the reading of some of the halftone dots of a test patch due to gap 36, the second orientation of the test patch allows the sensor 30 to detect at least part of the halftone dots intersecting line or row 40. Thus, when the data is filtered, such as shown by the averaged M and N line output in FIG. 12, the butting error is filtered out and no longer affects the halftone frequency profile, as shown at 124. This indicates that the reading of the amount of toner (or level of coverage) of the patch(es) by array sensor 30 is substantially less or substantially no longer affected by sensor/chip placement. Then, the application of the TRC correction resolution is at least more accurate in the output image and errors or non-uniformities are substantially reduced or eliminated.

Figure 13:
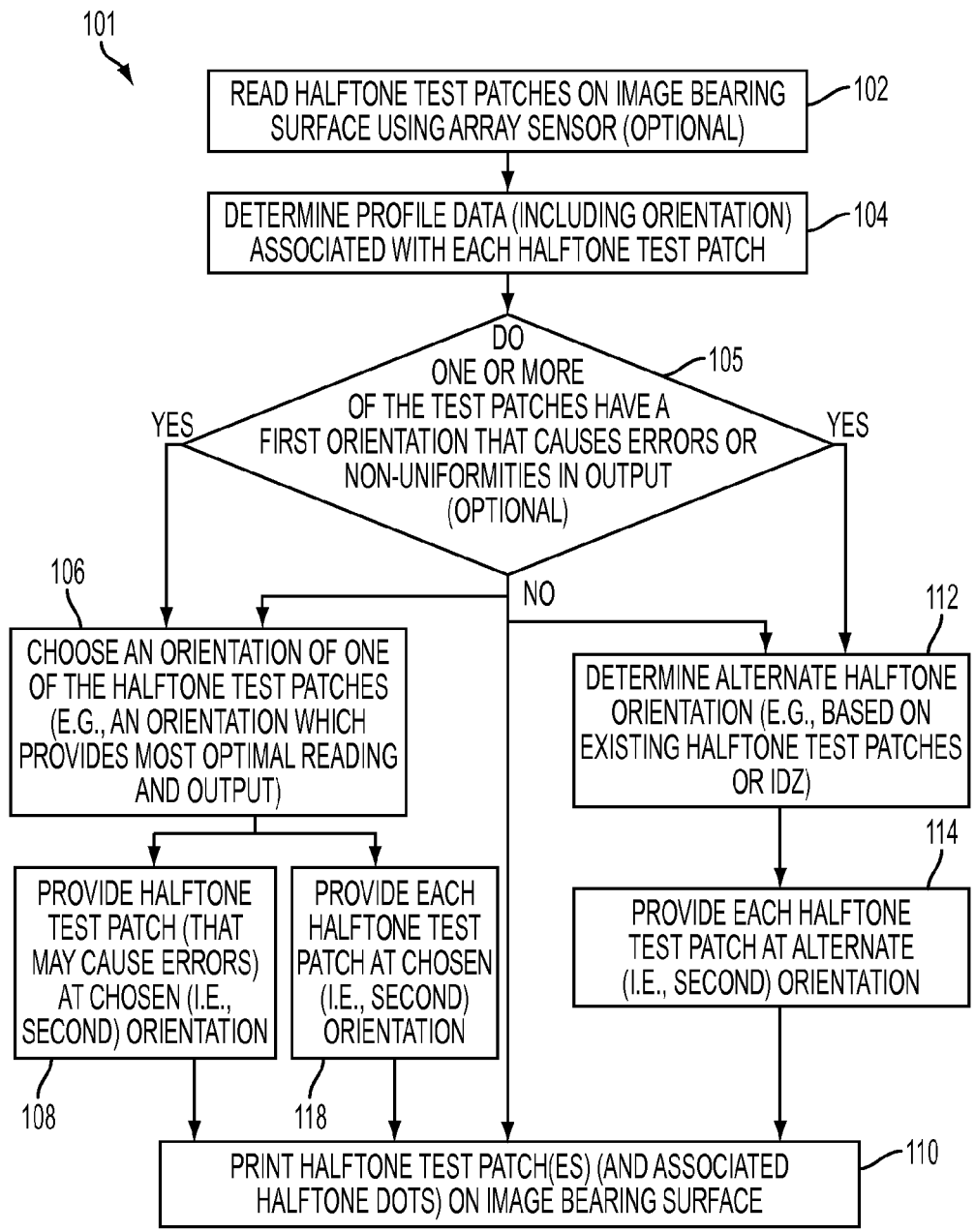
FIG. 13 illustrates exemplary methods for determining a second orientation for one or more halftone test patches in accordance with another embodiment of the disclosure.

The second orientation or angle 98 for providing, orienting, rotating one or more halftone test patches should not be limiting. In fact, this disclosure provides several, non-limiting exemplary embodiments for determining a second orientation for one or more test patches. FIG. 13 illustrates two exemplary methods for determining and printing halftone dots of test patches at a second orientation.

As shown, the method 101 may begin at 102 by reading the halftone test patch on an image bearing surface (e.g., such as photoreceptor 52) using its sensors 64 and/or 66 (e.g., array sensor 30). However, as discussed above with respect to FIG. 9, this step and others may be optional. For example, a processor or controller 100 of the printing apparatus 50 may not require reading of the test patches that are already on an image bearing surface as shown at 102. In an embodiment, the first orientation of the halftone dots of the one or more test patches may be determined without printing and/or reading. At 104 profile data associated with each halftone test patch, including a first orientation of the halftone dots of each patch, may be determined.

In an embodiment, after profile data is determined at 104 for each halftone patch that is printed and read (or to be printed), it may optionally be determined if one or more of the test patches have halftone dots of a first orientation that may cause errors or non-uniformities in output at 105. For example, as noted above, it may be determined if one or more of the test patches and halftone dots have a first orientation of 90 degrees. Alternatively, other methods for determining possible non-uniformities may also be used. In another embodiment, such determination may not need to be made at 105. As an example, a black (K) test patch may be determined at 105 to have an orientation that may cause errors (e.g., an orientation of 90 degrees).

Thereafter, in one embodiment, a (first) orientation of the halftone dots of one of the existing halftone test patches may be chosen at 106. An orientation which provides a better, adjusted better reading (e.g., most optimal) and output (e.g., for the color layer that will average or filter best) may be chosen from the group of read halftone patch orientations. For example, if a cyan (C) test patch is determined to have a most optimal orientation of 30 degrees, the orientation of cyan test patch may be chosen. Then, in one embodiment, the halftone test patch that may cause errors (i.e., the black (K) test patch), may be provided at the chosen orientation (i.e., 30 degrees) at 108. Alternatively, in another embodiment, the chosen halftone pattern and orientation may be implemented for all test patches/color layers being printed. This can eliminate the need for more memory in the system, for example, as only the appropriate halftone patterns in existing memory would need to be altered. As shown at 118, the halftone dots of each color halftone test patch may be provided at the chosen orientation. In either case, the one or more color halftone test patches may then be printed on the image bearing surface at 110 (e.g., as HTx in FIG. 8, wherein "x" represents C, Y, M, K, or Z, an alternate or optimized determination, noted below). Again, as noted above, the orientation for printing dots in the document image area is unaffected.

In yet another embodiment, an alternate halftone pattern may be created or generated that is different than all the existing document color halftone test patches. This may require a little bit more memory but would enable more accurate sensing with a minimal amount of scan lines (or, in other words, in smaller space (IDZ)) for the test patches. As shown in FIG. 13, an alternate halftone pattern and thus second orientation may be determined at 112. Then, each halftone test patch may be provided at the alternate orientation, as depicted at 114. The halftone test patches may then be printed (e.g., HTz) on the image bearing surface at 110. For example, the plurality of color marking stations of printing apparatus 50 may print the halftone dots of the at least one test patch at the second orientation on the image bearing surface 52 (e.g., on the IDZ 72) so that it may be read by the one or more sensors of sensor 64. The dot orientation for printing or raster output in the document image area remains unaffected. That is, the plurality of color marking stations of printing apparatus 50 may print the halftone color image data of the document in the image areas of the image bearing surface 52 for output. Each halftone orientation of each color of the image data is processed (e.g., TRC and RIP) and printed at the first orientation even though the corresponding halftone test patch is processed (e.g., TRC and RIP) at the second orientation (both of which are generally not visible to the human eye).

In an embodiment, the second, alternate orientation (and angle) for the halftone test patches may be determined at 112 by considering an angle at which each patch should be tilted so that the gap would subsample a halftone period in several places (i.e., as shown by row 40 in FIG. 10) and so that the effective gap area would not be substantially effective on the halftone test patches at that angle. For example, an optimal tilt angle could be determined for a given number of scan lines such that the amount of subsamples would cover exactly 1 or more integer numbers of halftone periods. In general, as the number of scan lines average becomes large, it is less important that the amount of half tone periods be exactly an integer. As long as the number of half tone periods covered is fairly large (e.g., 15.8 or 16.1), for practical purposes, it is sufficient to use a given number of scan lines. As shown by the formula below, if the signal to noise ratio (SNR) of the sensor and marking is otherwise high enough, the minimum number of scan lines could be substantially low (e.g., 16 lines with a 175 dpi halftone) at the correct angle to give 16 different subsamples through one halftone period (assuming a maximum chip-to-chip gap of about 10 um):

$$\text{HT Angle} = \text{ATAN}((C*D)/(A*B))*180/\pi(\ )$$

Where:
HT Angle is halftone angle
A TAN is an arctangent.
A is a number of halftone periods (e.g., of the patch at a first orientation)
B is a sensor's dots per inch (dpi)
C is halftone's (HT) dots per inch (dpi)
D is a number (#) of scan lines The following chart illustrates a number of exemplary determination of the halftone angle for a sensor with dpi of 600 and halftone dpi of 175:

| A | # HT periods | 1 | 1 | 1 | 4 | 16 |
|---|---|---|---|---|---|---|
| B | sensor dpi | 600 | 600 | 600 | 600 | 600 |
| C | HT dpi | 175 | 175 | 175 | 175 | 175 |
| D | # lines | 16 | 32 | 256 | 256 | 256 |
|   | HT angle | 77.9 | 83.9 | 89.2 | 86.9 | 77.9 |

In an embodiment, the above formula may be used to determine the second orientation or halftone angle (e.g., angle 98 of FIG. 10) of the halftone dots of the test patch to provide an integer number of halftone periods for a total number of scan lines in a test patch (e.g., step 90 in method 80; step 106 or 112 in method 101). However, other formulas or determinations to determine a second or alternate orientation for the test patch or cell may also be used and are within the scope of this disclosure.

It is also noted that if the determination at 105 does not find that one or more of the halftone test patches causes errors in output, i.e., "NO," (or if the determination is not made), the method 101 may either still implement the determination or selection of a second orientation as shown at 106 or 112, or the halftone test patterns may be printed in their first orientations at 110.

As such, the herein disclosed methods 80 and 101 and printing apparatus 50 used to implement such methods disclose using different halftone orientations for halftone test patches and document imaging areas. In an embodiment, one orientation of a color halftone test patch is used for all of the color test patches. In another embodiment, a second orientation is chosen from the group of first orientations of halftone test patches as an optimal orientation for all of the color halftone test patches. In yet another embodiment, an optimized second orientation determined from all of the halftone test patches may be used for all of the color test patches. In an embodiment, each halftone test pattern may be angled or oriented so that an integer number of halftone dots of the test pattern are sampled by a sensor for a certain test patch size.

Also, it is shown that subsampling enough times in a period may be based on halftone dpi, minimum imaging spot size, maximum chip gap (or dead region between pixels) and allowable TRC measurement error. One or more mathematical formulas and/or computer code can be written to perform such methods.

By altering the halftone dots of the test patch orientation, this disclosure provides improvements in TRC sensing and corrects insensitivities of array sensors that are subject to misreadings due to slight chip gap(s). Therefore, the frequency and correction of streaks possibly caused by TRC correction is not limited by cross-process direction filtering. Even if effective density or mass of the toner varies with orientation of the halftone test patterns (e.g., when provided at a second orientation), TRC correction would still substantially reduce or eliminate non-uniformities in the cross-process direction B. If an absolute shape of the TRC had to be adjusted for all pixels, it could be a one time engineering correction. Furthermore, a minimum amount of IDZ space is wasted for test patches with acceptable TRC control. Moreover, the disclosed methods are easy to implement.

It should be noted that one or more of the sensors 64 and/or 66 used with printing apparatus 50 may be calibrated before use. For example, a calibration such as disclosed in U.S. Patent Application Publication No. 2009/0047032 A1, Ser. No. 11/838,383, filed Aug. 14, 2007, which is hereby incorporated by reference in its entirety, may be used to calibrate one or more of the sensors before performing the methods described herein.

The methods for analyzing and processing the halftone test patches may be performed constantly while printing as well as initially during cycling (powering) up of the apparatus or machine. When printing images, xerographics may continuously drift, get contaminated, age, and the like, and thus need adjustments. The herein described methods can provide such adjustments within little times (e.g., a few seconds) and correct potentially visible errors.

Although this disclosure describes halftone test patches being oriented at 0 and 90 degrees as causing non-uniformities and/or other errors, it is to be understood by one of ordinary skill in the art that such orientations or angles are not meant to be limiting as "first" or "initial" orientations that cause non-uniformities in a printed document. As such, it is to be understood that a variety of methods may be used to determine that a first orientation of the halftone dots of a test patch may cause output non-uniformities. Alternatively, as noted, such a step may be eliminated from the herein disclosed processes, and such steps may be implemented on any read test patch orientations.

Additionally, any number of apparatuses or systems may be used to perform the herein disclosed methods and should not be limited to the illustrated printing apparatus 50 of FIG. 7. Any system needing or requiring high fidelity sensing of halftones for closed looped TRC control of print quality may implement the methods, such as printers, copiers, multi-function devices (MFDs) or other product that uses a sensor to monitor halftones and their correlated patches.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that this disclosure has been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A processor-implemented method for minimizing cross-process direction non-uniformities of images in printed documents using a printing apparatus, the printing apparatus comprising a processor for processing documents containing image data, an image bearing surface with a monitoring area and an image area for movement in a process direction, and one or more sensors for monitoring the image bearing surface in a cross-process direction, the processor implementing the method comprising:

receiving color image data of a document, the image data comprising a plurality of color pixels and the document comprising at least one page of image data;

generating a halftone test patch for each color in the image data to be provided in the monitoring area on the image bearing surface;

determining profile data of each test patch, the profile data including a first orientation of halftone dots of the test patch representing a halftone orientation of its associated halftone color image data for output in the image area of the image bearing surface;

determining a second orientation for the halftone dots of at least one test patch; and providing the halftone dots of the at least one test patch at a second orientation in the monitoring area, wherein the halftone orientation of its associated halftone color image data in the image area is unaffected for output.

2. The processor-implemented method of claim 1, further comprising:

determining if the first orientation of the halftone dots of the at least one test patch causes non-uniformities in a printed document, and if the first orientation causes non-uniformities, providing the halftone dots of the test patch at a second orientation for printing in the monitoring area;

else, if the first orientation does not cause non-uniformities, providing the halftone dots of the test patch in the first orientation for printing in the monitoring area.

3. The processor-implemented method of claim 2, wherein the first orientation of the halftone dots of the at least one test patch is determined to cause non-uniformities if the first orientation of the test patch is approximately 0 or 90 degrees with respect to the cross-process direction.

4. The processor-implemented method of claim 1, wherein determining a second orientation for the halftone dots of the at least one test patch comprises:

comparing the first orientations of the halftone dots of each of the generated test patches for each color to be marked in the monitoring area;

choosing the second orientation from each first orientation based on the comparison.

5. The processor-implemented method of claim 4, further comprising:

rotating the halftone dots of each test patch to the second orientation.

6. The processor-implemented method of claim 1, wherein determining a second orientation for the halftone dots of the at least one test patch comprises:

determining an adjusted, second orientation based on each of the first orientations of the test patches.

7. The processor-implemented method of claim 6, further comprising:

rotating the halftone dots of each test patch to the second orientation.

8. The processor-implemented method of claim 6, further comprising:

providing the halftone dots of each test patch at the second orientation.

9. The processor-implemented method of claim 1, wherein the providing the halftone dots of the at least one test patch at the second orientation comprises:

rotating the halftone dots of the at least one test patch to the second orientation, the second orientation being at an angle from the first orientation.

10. The processor-implemented method of claim 1, wherein the providing the halftone dots of the at least one test patch at the second orientation comprises:

generating at least one new test patch representing the at least one test patch with halftone dots at a second orientation.

11. The processor-implemented method of claim 1, wherein the providing the halftone dots of the at least one test patch at the second orientation comprises:

generating a rotated version of the halftone dots of the at least one test patch in the second orientation, wherein the second orientation comprises the halftone dots of the test patch that are at an angle rotated from the first orientation.

12. The processor-implemented method of claim 1, further comprising:

printing the halftone dots of the at least one test patch at the second orientation on the monitoring area of the image bearing surface for reading by the one or more sensors, and printing the halftone color image data of the document at the halftone orientation in the image area, the halftone orientation of the image data being at the first orientation.

13. The processor-implemented method of claim 12, wherein the printing of the halftone dots of the at least one test patch comprises printing the at least one test patch on an inter-document zone of the image bearing surface, the inter-document zone comprising at least one area on the image bearing surface between image areas used for printing the document.

14. A printing apparatus for processing documents containing image data comprising:

a photoreceptor comprising one or more image areas and an inter-document zone for movement in a process direction, the inter-document zone comprising at least one area on the photoreceptor between the one or more image areas used for output;

a plurality of color marking stations for applying color in a process direction to the photoreceptor in the one or more image areas and the inter-document zone;

one or more array sensors for sensing the color applied to the photoreceptor in a cross-process direction;

a processor for receiving color image data of a document, the image data comprising a plurality of color pixels and the document comprising at least one page of image data, the processor performing the following operations:

generating a halftone test patch for each color in the image data to be provided in the inter-document zone;

determining profile data of each test patch, the profile data including an first orientation of halftone dots of the test patch representing a halftone orientation of its associated color for output in the one or more image areas;

determining a second orientation for the halftone dots of the at least one test patch; and providing the halftone dots of the at least one test patch at a second orientation in the inter-document zone, wherein the halftone orientation of its associated color in the one or more image areas is unaffected for output.

15. The printing apparatus of claim 14, wherein the processor further performs the following operations:

determining if the first orientation of the halftone dots of the at least one test patch causes non-uniformities in a printed document, and if the first orientation causes non-uniformities, rotating the halftone dots of the test patch to a second orientation for printing in the inter-document zone;

else, if the first orientation does not cause non-uniformities, providing the halftone dots of the test patch in the first orientation for printing in the inter-document zone.

16. The printing apparatus of claim 15, wherein the first orientation of the halftone dots of the at least one test patch is determined to cause non-uniformities if the first orientation of the test patch is approximately 0 or 90 degrees with respect to the cross-process direction of the photoreceptor.

17. The printing apparatus of claim 14, wherein determining a second orientation for the halftone dots of the at least one test patch by the processor comprises:
- comparing the first orientations of the halftone dots of each of the generated test patches for each color to be marked in the inter-document zone;
- choosing the second orientation from each first orientation based on the comparison.

18. The printing apparatus of claim 17, further comprising:
- the processor rotating the halftone dots of each test patch to the second orientation.

19. The printing apparatus of claim 14, wherein determining a second orientation for the halftone dots of the at least one test patch by the processor comprises:
- determining an adjusted, second orientation based on each of the first orientations of the test patches.

20. The printing apparatus of claim 19, further comprising:
- the processor rotating the halftone dots of each test patch to the second orientation.

21. The printing apparatus of claim 14, further comprising:
- the processor providing the halftone dots of each test patch at the second orientation.

22. The printing apparatus of claim 14, wherein the providing the halftone dots of the at least one test patch at the second orientation by the processor comprises:
- rotating the halftone dots of the at least one test patch to the second orientation, the second orientation being at an angle from the first orientation.

23. The printing apparatus of claim 14, wherein the providing the halftone dots of the at least one test patch at the second orientation by the processor comprises:
- generating at least one new test patch representing the halftone dots of the at least one test patch at a second orientation.

24. The printing apparatus of claim 14, wherein the providing the halftone dots of the at least one test patch at the second orientation by the processor comprises:
- generating a rotated version of at least one test patch in the second orientation, wherein the second orientation comprises the halftone dots of the test patch that are at an angle rotated from the first orientation.

25. The printing apparatus of claim 14, wherein the plurality of color marking stations print the halftone dots of the at least one test patch at the second orientation on the photoreceptor for sensing by the one or more sensors and wherein the plurality of color marking stations print the halftone color image data of the document at the halftone orientation in the one or more image areas for output, the halftone orientation of the image data being at the first orientation.

26. The printing apparatus of claim 25, wherein the halftone dots of the at least one test patch is printed on the inter-document zone of the photoreceptor and wherein the halftone color image data is printed in the one or more image areas on photoreceptor.

* * * * *